United States Patent [19]

Regache

[11] Patent Number: 5,579,312

[45] Date of Patent: Nov. 26, 1996

[54] METHOD AND APPARATUS FOR SCHEDULING THE TRANSMISSION OF CELLS OF GUARANTEED-BANDWIDTH VIRTUAL CHANNELS

[75] Inventor: Pascal Regache, Eybens, France

[73] Assignee: Hewlett-Packard Company, Palo Alto, Calif.

[21] Appl. No.: 453,657

[22] Filed: May 30, 1995

[30] Foreign Application Priority Data

Jun. 28, 1994 [EP] European Pat. Off. .............. 94410045

[51] Int. Cl.$^6$ ..................................................... H04L 12/56
[52] U.S. Cl. ..................... 370/60.1; 370/85.6; 370/85.7
[58] Field of Search ............................... 370/17, 85.2, 60, 370/60.1, 61, 84, 94.1, 94.2, 95.1, 85.6, 85.7; 340/825.5, 825.51

[56] References Cited

U.S. PATENT DOCUMENTS

| | | | |
|---|---|---|---|
| 4,980,886 | 12/1990 | Bernstein .................. | 370/85.7 |
| 5,231,633 | 7/1993 | Hluchyj et al. ............. | 370/60 |
| 5,280,475 | 1/1994 | Yanagi et al. .............. | 370/60 |
| 5,357,506 | 10/1994 | Sugawara .................. | 370/85.6 |
| 5,390,184 | 2/1995 | Morris ....................... | 370/60 |
| 5,392,280 | 2/1995 | Zheng ....................... | 370/60 |
| 5,448,559 | 9/1995 | Hayter et al. ............. | 370/60.1 |
| 5,455,825 | 10/1995 | Lauer et al. ............... | 370/60 |

FOREIGN PATENT DOCUMENTS

| | | |
|---|---|---|
| 0381275 | 8/1990 | European Pat. Off. . |
| 0471379 | 2/1992 | European Pat. Off. . |
| 0471344 | 2/1992 | European Pat. Off. . |
| 0519814 | 12/1992 | European Pat. Off. . |
| 0522391 | 1/1993 | European Pat. Off. . |

OTHER PUBLICATIONS

"Architecture Design for Regulating and Scheduling User's Traffic in ATM Network"—Jonathan Chao pp. 77–87, 1992.

Internet message—Peter Newman—Jun. 1994.

*Primary Examiner*—Douglas W. Olms
*Assistant Examiner*—Chau T. Nguyen

[57] ABSTRACT

In order to schedule the transmission of cells of guaranteed-bandwidth virtual channels, a circular list is provided having a predetermined number of entry slots and each channel with cells to send has a corresponding identifier VCN placed in a respective slot in the list, only one VCN being allowed per slot. The list is advanced through slot by slot and each VCN encountered is processed to cause the transmission of a cell for the corresponding virtual channel. The list is also updated for each slot advanced past by freeing that slot and inserting back into the list any VCN that occupied the slot if that VCN relates to a virtual channel with another cell to transmit. This insertion is effected at an offset from the slot previously occupied by the VCN, dependent on a transmission rate indicator (SRP, PRP) of the virtual channel concerned. In the event of the target slot being occupied a conflict resolution procedure is effected based on the relative priority of the channel involved, the unsuccessful channel being displaced to the following slot, subject to availability.

12 Claims, 4 Drawing Sheets

METHOD AND APPARATUS FOR SCHEDULING THE TRANSMISSION OF CELLS OF GUARANTEED-BANDWIDTH VIRTUAL CHANNELS

The present invention relates to a method and apparatus for scheduling the transmission of cells of guaranteed-bandwidth virtual channels; in particular, but not exclusively, the present invention relates to the transmission scheduling of guaranteed-bandwidth virtual channels in ATM systems.

ATM (Asynchronous Transfer Mode) is a multiplexing and switching technique for transferring data across a network using fixed sized cells that are synchronous in the sense that they appear strictly periodically on the physical medium. Each cell comprises a payload portion and a header, the latter including a label that associates the cell with an instance of communication between sending and receiving network end systems; this instance of communication may involve the transfer of many cells from the sending end system, possibly to multiple receiving end systems. ATM is asynchronous in the sense that cells belonging to the same instance of communication will not necessarily appear at periodic intervals.

In ATM, the labels appended to the cells are fixed-size context dependent labels, that is, they are only understandable in the light of context information already established at the interpreting network node, the label generally being replaced at one node by the label required for the next node. In other words, ATM is a virtual circuit technology requiring a set up phase for each instance of communication to establish the appropriate label knowledge at each node.

The virtual circuit label for an ATM cell on a particular link is formed by a Virtual Path Indicator (VPI) and a Virtual Channel Indicator (VCI) present in the cell header. This label forms the basis on which the cell is routed at the next network node it encounters. Generally, in ATM parlance, a virtual circuit is called a "Virtual Channel" and the VPI fields can be thought of as identifying a group of virtual channels on a link whilst the VCI identifies a particular virtual channel in that group.

ATM technology is timing increasing popularity because it can offer an acceptable compromise in combining time-liness characteristics (normally associated with circuit switching technologies) and statistical advantage (associated with packet switching technologies). ATM holds out the prospect of a single transfer mode technology for carrying all traffic types, including voice, entertainment services, or computer traffic. This flexibility of use is made available by offering different qualities of service (QOS) to the user, the chosen QOS then attaching to the virtual channel used for the communication. The two main types of QOS are:

- a "best efforts" QOS where the ATM system does its best to deliver cells of the virtual channel concerned subject to first satisfying priority services—in other words, the system makes no guarantee regarding delivery rate;
- a "guaranteed bandwidth" QOS where the ATM system guarantees a certain bandwidth to the virtual channel concerned. This guarantee is generally not a hard one—in other words, the term "guaranteed bandwidth" is intended to indicate a type of service that is offered as normally providing a particular transmission bandwidth rather than meaning that the technical service providing means will always meet the service level subject of the guarantee.

Where multiple guaranteed bandwidth virtual channels are simultaneously operating over the same link, it becomes necessary to effect some son of scheduling between channels having cells to transmit; a number of scheduling arrangements are know including a simple round-robin approach where each channel is taken in strict rotation.

It is also necessary to ensure that a channel does not take up available bandwidth to a level way above its guarantee and to this end, it is well known to effect traffic shaping that limits the transmission rate of a channel. Many of the schemes for effecting traffic shaping utilise a so-called "leaky bucket" algorithm by which transmission credits are built up at a steady rate and credits are then consumed as cells are sent. By placing a maximum size on the credit bucket, a limit can be placed on any cell burst resulting from the sudden availability of cells for a channel on which credit has been building for some time.

It is possible to combine scheduling and traffic shaping. According to one known approach, a fixed-size circular list is provided and each channel is inserted one or more times in fixed locations in the list; taking each list entry in turn provides both scheduling and a fixed bandwidth for each channel, this bandwidth being proportional to the number of times a channel is present in the list.

Another approach has been recently described in a proposal made to the ATM Forum. According to this proposal, a circular timing chain is provided, composed of a predetermined number of slots which may be empty, contain a pointer to a virtual Channel, or a pointer to a linked list of channels. As the chain is advanced, at each new slot the action taken will depend on the slot contents; thus for an empty slot no action is taken (no cell sent for the current cell period), for a slot containing a pointer to only one channel, a cell is sent on that channel, and for a slot containing a pointer to a a linked list of channels, a cell is sent on each channel in turn. Once a cell has been sent on a virtual channel, if there are more cells to send, a pointer to the channel is reinserted into the timing chain at an offset from its previous insertion point set by the desired transmission rate. Because the presence of multiple channels associated with the same slot effectively upsets the timing of the scheduling of subsequent channels, the scheduler will attempt to skip empty slots to make up.

A drawback of this arrangement is that a high-priority channel may suffer significant delay from its desired transmission time simply because the pointer to this channel it has been inserted in a slot that immediately follows one associated with a long list of channels, possibly all of low priority.

SUMMARY OF THE INVENTION

According to one aspect of the present invention, there is provided apparatus for transmitting a stream of cells onto a link, the cells being associated with a plurality of different virtual channels each of which is identified in the apparatus by a respective virtual-channel identifier, herein "VCN"; the apparatus including a guaranteed-bandwidth scheduler for scheduling the transmission of cells of guaranteed-bandwidth virtual channels, the scheduler comprising:

- a circular list having a predetermined number of entry slots each capable of storing a single VCN, each virtual channel with a cell available for transmission, being represented in the list by the presence of its identifying VCN in a respective list slot;
- parameter storage means for storing virtual-channel parameter data specifying for each virtual channel a priority level and a transmission rate indicator;
- current-slot means for identifying a list entry slot as the current entry slot of interest and for periodically advancing the current entry slot one slot around the circular list;

processing means for accessing the current entry slot and for processing the VCN, if any, entered therein to cause the transmission of a cell of the corresponding virtual channel, the processing means including means for freeing the current entry slot; and update means for inserting a specified VCN in the list ahead of the current entry slot, each VCN processed by the processing means for which a cell is still available for transmission being passed by the processing means to the update means as a said specified VCN, and the update means comprising:

initial-target means for determining the initial position of a target entry slot for insertion of the specified VCN, the initial position of the target slot being at an offset from the current entry slot dependent on the transmission rate indicator for the virtual channel concerned, insertion means for inserting the specified VCN in the target slot unless there is already an occupying VCN in the slot; and conflict-resolution means activated by the insertion means in the presence of an occupying VCN in the target slot for determining on the basis of the associated virtual-channel priorities which of the specified and occupying VCN should take the target slot, the specified VCN taking the slot if it is of higher priority and the unsuccessful VCN becoming a said specified VCN for handling by the insertion means with a target slot corresponding to an entry slot subsequent to the one just considered.

With this arrangement, a high priority channel stands a good chance of gaining its desired position in the circular list or a position nearby.

Generally, the apparatus will also include best-effort scheduling means for controlling the transmission of cells of best-effort virtual channels. In this case, the apparatus is preferably responsive to the current list entry slot being free to initiate transmission of a cell under the control of the best-effort scheduling means.

Advantageously, each slot of the circular list has an associated indicator indicating whether the slot is free or contains an occupying VCN, the means for freeing the current entry slot setting this indicator to indicate the slot as free and any VCN in the slot being thereupon treated as invalid; in this case, the update means when inserting a VCN into a slot changes the associated indicator to indicate the slot as being occupied. Preferably, an indicator when set to indicate the associated slot as being occupied is set to a particular value in a range of values, this particular value being indicative of the priority level of the VCN stored in the slot; the benefit of this is that when the conflict-resolution means needs to determine the priority level of an occupying VCN, it can readily do so by reference to the associated indicator.

Advantageously, the parameter storage means stores for each virtual channel of a given type, a credit level and two values for the corresponding transmission rate indicator, these values being a peak rate value and a sustain rate value. In this case, the guaranteed-bandwidth scheduler further comprises:

credit-increase means for progressively increasing the credit level of a virtual channel of said given type during periods when that channel has no cells available for sending; and credit-decrease means for decreasing the credit level, if any, of a virtual channel of said given type each time a cell is transmitted on that channel; the initial-target means being responsive to the update means being passed a said specified VCN relating to a virtual channel of said given type, to determine the initial position of the target slot in dependence:

on the peak rate value of the transmission rate indicator if the virtual channel concerned has credit available as indicated by the credit level, otherwise, on the sustain rate value of the transmission rate indicator.

Preferably, the credit-increase means is constituted by the processing means, the processing means being responsive to the presence, in the current slot, of the VCN of a virtual channel of said given type,:

(a)—to cause the transmission of a cell on that channel if there is a cell available for transmission and otherwise to increase the credit level of the channel; and (b)—to notify the VCN of the channel to the update means as a said specified VCN regardless of whether there are any cells available for sending in respect of that channel;

the initial-target means determining the initial position of the target slot for a virtual channel of said given type with no cells for transmission, on the basis of the channel's sustain rate value.

According to another aspect of the present invention, there is provided a method of scheduling the transmission of cells of guaranteed-bandwidth virtual channels each of which is identified by a respective virtual-channel identifier, herein "VCN"; the method comprising the steps of:

providing a circular list having a predetermined number of entry slots and storing in a respective slot the VCN of each virtual channel with a cell available for transmission, advancing around the list from slot to slot and processing each VCN encountered to cause the transmission of a cell of the corresponding virtual channel; and updating the list by freeing each slot advanced past and inserting back into the list any VCN that occupied the slot if that VCN relates to a virtual channel with another cell to transmit, this insertion being effected by the sub-steps of:

(a) determining the initial position of a target entry slot for insertion of said VCN, the initial position of the target slot being at an offset from the slot previously occupied by the VCN, dependent on a transmission rate indicator of the virtual channel concerned, (b) inserting the VCN in the target slot unless there is already an occupying VCN in the slot; and (c) where there is an occupying VCN in the target slot, determining on the basis of priority levels associated with the virtual channels, which of the VCN requiring insertion and the occupying VCN should take the target slot, the VCN requiring insertion taking the slot if it is of higher priority and the unsuccessful VCN being passed back to sub-step (b) with a target slot corresponding to an entry slot subsequent to the one just considered.

According to a further aspect of the present invention, there is provided a guaranteed-bandwidth scheduler for scheduling the transmission of cells of guaranteed-bandwidth virtual channels, the channels being identified in the scheduler by respective identifying labels, herein VCNs; the scheduler comprising:

a circular list having a predetermined number of entry slots each capable of storing a single VCN;

initial-insertion means for inserting into a respective slot in the list the VCN of each guaranteed-bandwidth virtual channel with a cell available for transmission, each such channel being represented once in the list;

control means for advancing through the list slot by slot and for processing the VCN, if any, found in the current slot of interest whereby to cause the transmission of a cell of the corresponding virtual channel, the control means being further operative to remove the VCN, if any, in the current slot of interest, and if there are still cells to send on the virtual channel concerned, to insert the VCN in a slot offset ahead of the current slot by an amount dependent on a predetermined transmission rate for the channel concerned, the control means including conflict resolution means for resolving conflicts should the desired slot for inserting the VCN be already occupied.

Preferably, the scheduler is further arranged to build up credit for a virtual channel during periods when it has no cells for sending, such credit being used by the control means for causing cells to be transmitted, when available, at a higher rate than said predetermined transmission rate, this credit build up being effected by the initial-insertion means including the VCN of the channel concerned in said list, and by the control means upon encountering the VCN as it advances through the list, increasing the credit of the channel, the VCN being reinserted into the list by the control means unless its credit has reached a predetermined maximum value.

BRIEF DESCRIPTION OF THE DRAWINGS

A guaranteed-bandwidth scheduler embodying the invention and for scheduling the transmission of cells of guaranteed-bandwidth virtual channels, will now be particularly described, by way of non-limiting example, with reference to the accompanying diagrammatic drawings in which.

BEST MODE FOR CARRYING OUT THE INVENTION

Figure 1:
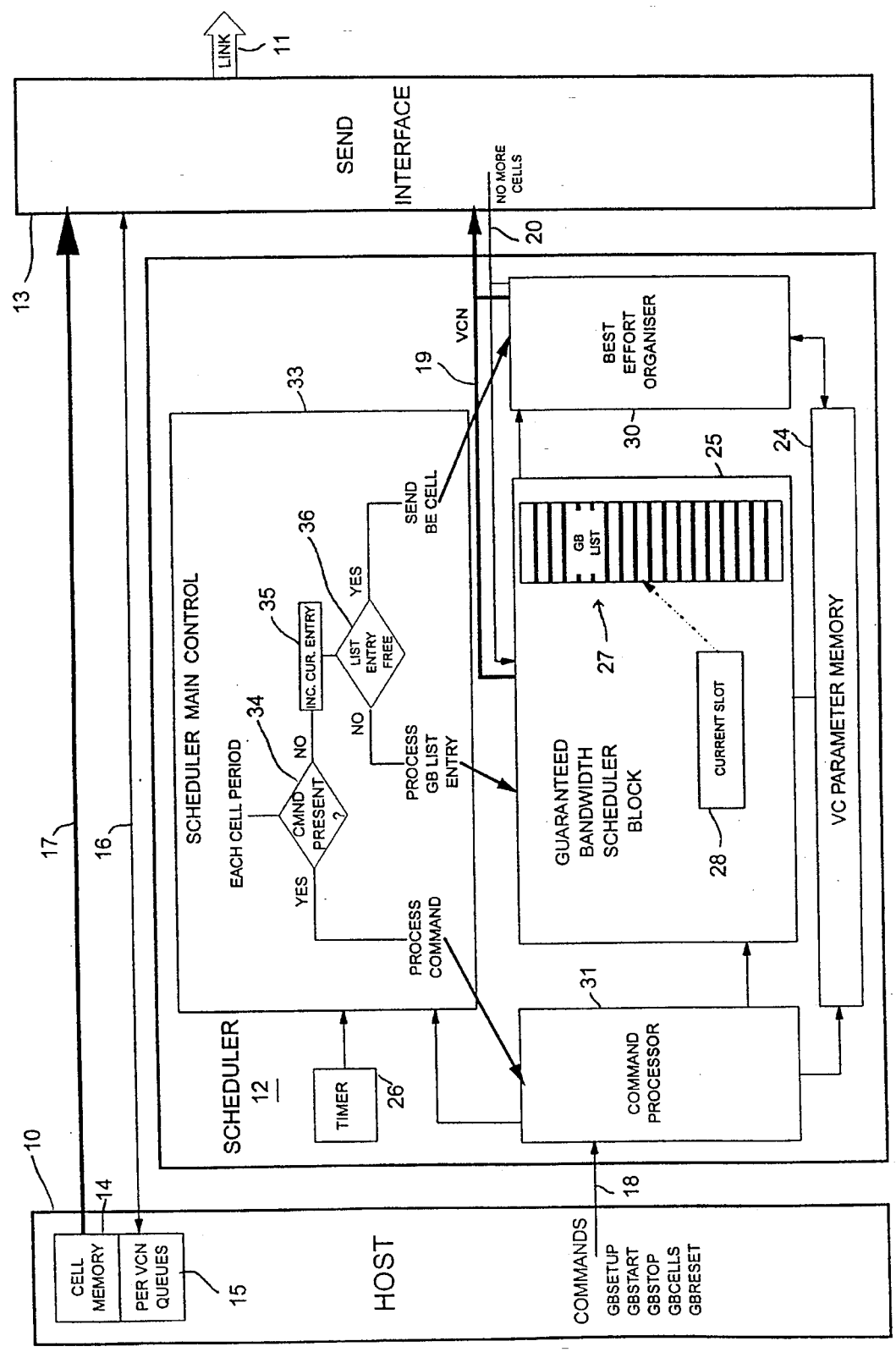
FIG. 1 is a functional block diagram of a scheduler for scheduling the transmission of cells form a host system onto a link via a send interface.

FIG. 1 shows a host system 10 arranged to transmit ATM cells associated with a plurality of different virtual channels onto a link 11 via a link adaptor comprising a scheduler 12 and a send interface 13.

Quality of Service

The host system 10 and link adaptor 12, 13 are arranged to handle virtual channels with three different qualities of service namely:

- a 'best efforts' (BE) quality of service for which no guarantee is given as to bandwidth availability;
- a first 'guaranteed bandwidth' (GB0) quality of service for which the scheduler 12 seeks to guarantee transmission of cells at a particular rate subject to cell availability, no credit being allowed for periods when cells are not available; and
- a second 'guaranteed bandwidth' (GB1) quality of service for which the scheduler 12 seeks to guarantee transmission of cells at a particular rate ('sustain' rate) when cells are continuously available but for which the scheduler will also seek to give credit for periods when cells are not available by accumulating credit tokens during such periods and then when cells are available effecting transmission at a higher rate ('peak' rate) according to the credit available, up to a predetermined number of cells (the 'burst' limit).

The present invention is concerned with the scheduling of guaranteed bandwidth virtual channels (that is, virtual channels with either a GB0 or GB1 quality of service) and accordingly a detailed description will not be given herein as to how best effort virtual channels are organised for transmission other than to describe how their scheduling is made subservient to the scheduling of guaranteed bandwidth (GB) virtual channels.

With regard to the scheduling of GB virtual channels, a priority level is allocated to each such channel from a limited number of possible levels (in the present example, there are three possible levels, namely low, medium and high priority levels). As will be more fully described hereinafter, these priority levels are used to assist in resolving scheduling conflicts.

It is also worth noting at this stage that each GB virtual channel can be stopped (that is, suspended rather than taken down) and started; furthermore, even when not stopped, a virtual channel may not be actively running as it may be waiting for cells to become available. All GB virtual channels are therefore considered by the GB scheduler to be described hereinafter to have three possible states, namely:

- a STOP state in which the virtual channel is suspended;
- a WAIT state in which the virtual channel is not suspended but is awaiting the arrival of cells to send, and;
- a RUN state in which the virtual channel is not suspended and has cells to send.

In addition, GB1 virtual channels have a fourth state:

- an ACCUM state in which the virtual channel is not suspended but has no cells to send and is accumulating credits to enable it to transmit at its peak rate when cells are available.

These states are shown in the state transaction diagram of FIG. 3 which will be described in more detail hereinafter (the same diagram being usable for both GB0 and GB1 virtual channels).

General Arrangement

Returning to a consideration of FIG. 1, within the host system 10 and link adaptor each virtual channel is identified by a respective virtual channel number (VCN).

The host system 10 is responsible for controlling the setting up and taking down of virtual channels. For each virtual channel the host system 10 stores the cells to be transmitted in a cell, memory 14 and keeps a respective queue of cell pointers for these cells in a queue block 15. When the queue block 15 is prompted with a VCN, it takes the head pointer from the queue of cell pointers for the virtual channel identified by that VCN, and uses the pointer to access the corresponding cell in the memory 14. This cell is then output on a bus 17.

The host system 10 keeps the scheduler 12 informed of which virtual channels currently exist, whether or not they are stopped, and when more cells become available for a virtual channel previously awaiting cells. This information is transferred using commands passed over a command interface 18. For GB virtual channels, these commands comprise:

GBS ETUP—notifies the scheduler of a new virtual channel and passes it the relevant quality of service parameters for the channel;

GBSTART—enables transmission for a specified virtual channel;

GBSTOP—disables (stops) transmission for a specified virtual channel;

GBCELLS—notifies the scheduler that more cells have become available for transmission;

GBRESET—effectively removes a virtual channel from the scheduler.

Similar commands also exist for BE virtual channels; indeed, the commands are generally the same except for the contents of the SETUP command. However, as the present description is concerned with GB virtual channels, the commands for BE channels will not be further considered.

The scheduler 12 is responsible for determining the identity of the virtual channel for which a cell is next to be transmitted on the link 11. The scheduler 12 identifies the virtual channel to the send interface 13 by passing it the VCN of the virtual channel over connection 19.

The send interface 13 uses this VCN to access the queue block 15 of the host system 10 over a connection 16, resulting in the output on the bus 17 of the next cell to be sent on the virtual channel concerned. The send interface then transmits the cell received over bus 17 onto the link 11. If no more cells are available for the virtual channel concerned, this is indicated to the send interface 13 by the queue block 15 and the send interface 13 in turn informs the scheduler 12 over line 20.

The Scheduler 12

Considering next the scheduler 12 in more detail, this includes a VC parameter memory 24 for storing quality of service parameters of each GB virtual channel notified to the scheduler by the GBSETUP command and not yet removed by the GBRESET command. Details of these parameters will be given hereinafter with reference to FIG. 3.

The main functional block of the scheduler 12 is a guaranteed bandwidth (GB) scheduler block 25 operative to determine on which GB visual channel, if any, a cell should be transmitted in a current cell transmit period. The cell period timing is determined for the scheduler 12 by a timer 26. The key elements of the GB scheduler block 25 are a circular list or table 27 containing a predetermined number of entry slots each capable of holding a single VCN, and a current-slot tracker 28 keeping track of the list entry slot currently of interest. The current-slot tracker is advanced at the start of every cell transmit period to point to the next entry slot of the list 27. Every GB virtual channel with a cell to send has its VCN inserted in a respective entry slot of the list 27, there being only one entry per virtual channel. As each table entry slot becomes the current slot, if it contains the VCN of a virtual channel with cells to send, then this VCN is output from the scheduler 12 to the send interface 13 to cause a cell to be sent on that virtual channel; at the same time, the VCN is moved forward in the table by a number of slots dependent on the transmission rate guarantee, as will be more fully described hereinafter.

If the current slot of the table 27 does not contain the VCN of a virtual channel with cells to send, then the scheduler 12 is arranged to cause the sending of a cell on a BE virtual channel. This is implemented by activating a best effort organiser block 30 for the relevant cell transmit period, this block determining the BE virtual channel on which a cell is to be sent and outputting the VCN of this channel to the send interface 13.

Of a greater priority in the scheduler 12 than the GB scheduler block 25, is a command processor block 31. If a command is awaiting processing, then the next one (or more) cell periods are dedicated in the scheduler 12 to this processing: the cell periods concerned are not therefore cell transmit periods and the current-slot tracker 28 in the GB scheduler block 25 is accordingly not advanced.

A main control block 33 determines which of the three blocks 31, 25, 30 (command processor 31, GB scheduler block 25, best effort organiser 30) is active in each cell period. Thus, at the start of each cell period (indicator by the: main timer 26), the main control block 33 determines whether a command is awaiting processing by the command processor 31—see block 34 of the small flow chart contained within block 33 in FIG. 1. If a command is awaiting processing, the command processor 31 is activated for the current cell period. However, if no command is waiting to be processed, the main control block 33 causes the current slot tracker 28 to advance one slot in the list 27 (box 35); thereafter, if the new current slot is occupied, control passes to the GB scheduler 25, otherwise, control passes to the best effort organiser 30 (box 36).

The Components for the GB Scheduler 25

Figure 2:
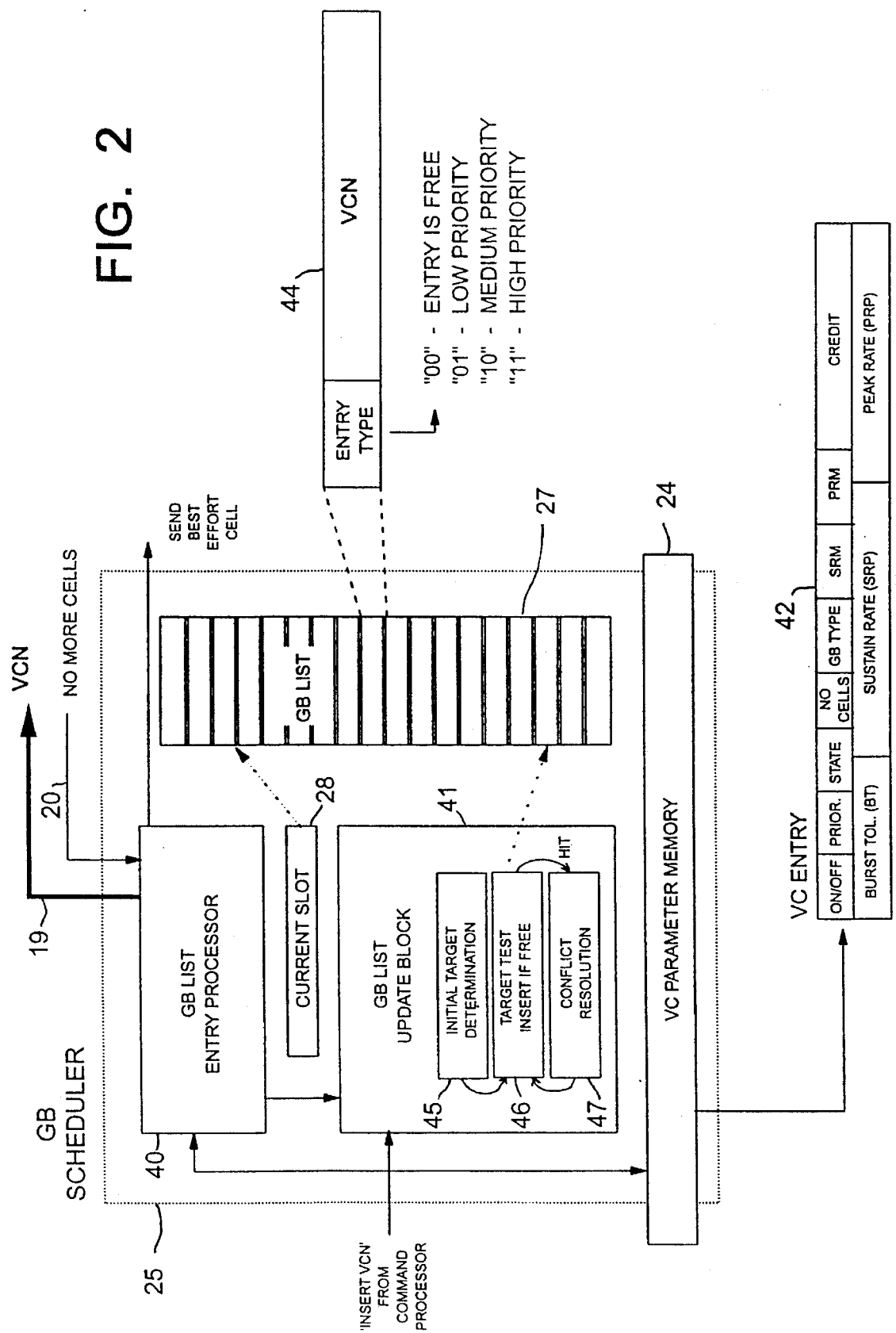
FIG. 2 is a functional block diagram of a guaranteed bandwidth scheduler block of the FIG. 1 scheduler.

FIG. 2 shows the structure of the GB scheduler 25 in more detail. In addition to the circular list 27 and current-slot tracker 28, the GB scheduler 25 comprises a list entry processor 40 and a list update block 41.

The scheduler 25 may also conceptually be considered as including the VC parameter memory 24, at least to the extent that the latter holds data on GB virtual channels. For each GB virtual channel, the memory 24 maintains an entry 42 accessible by using the VCN of the virtual channel concerned. Each GB entry 42 comprises the following fields:

| | |
|---|---|
| ON/OFF | this is a flag field set to 0 ('OFF') by the command processor 31 to stop the virtual channel concerned. |
| PRIORITY | this field indicates the priority level (low medium or high) of the GB virtual channel; |
| STATE | this field indicates the current state of the virtual channel (STOP, WAIT,RUN and, for GB1 channels, ACCUM); |
| NO-CELLS | this field is used to indicate whether cells are awaiting transmission for a virtual channel; |
| GBTYPE | indicates whether the virtual channel is of type GB0 or GB1; |
| PEAK RATE | this field contains the peak rate parameter (PRP) that determines the transmission rate for GB0 virtual channels and for GB1 channels with credit available; |
| PRM | this field specifies how the PRP field should be interpreted (applicable where more than one format is available for specifying peak rate); |
| SUSTAIN RATE | this field contains the sustain rate parameter (SRP) that |

|  | determines the transmission rate for GB1 virtual channels that have no credit for sending at their peak rates; the SRP also determines the rate at which credit can be accumulated by a GB1 virtual channel awaiting cells to send; |
| --- | --- |
| SRM | this field specifies how the SRP should be interpreted (applicable where more than one format is available for specifying sustain rate); |
| CREDIT | this field is used to keep a count of the credit accumulated by a GB1 virtual channel whilst awaiting a cell to send; |
| BURST TOL | this field specifies the burst tolerance (BT) of a GB virtual channel, that is, the maximum number of cells that a GB1 virtual channel may send consequently at peak rate. |

Each entry 42 is created in response to a GBSETUP command being received by the command processor 31, and is removed in response to a GBRESET command being received by the command processor 31. During the currency of a GB virtual channel, the fields ON/OFF, STATE and NO-CELLS are modifiable by the command processor and/or the list entry processor 40.

With reference to the circular list 27, the size (number of slots N) of this list is related to the minimum transmission rate that is to be supported. This is because, as already mentioned, if the current slot contains a valid entry relating to a GB virtual channel with cells to send, then after processing of the entry, the virtual channel (that is, its VCN) is moved to a new slot in the list, offset from the current slot by an amount dependent on the required transmission rate for the channel; the maximum displacement between occurrences of a VCN will therefore correspond to the size N of the list. As a result, the minimum transmission rate supportable is (1/N) times the link transmission rate, which leads to:

$$N = \frac{\text{link transmission rate}}{\text{minimum transmission rate}}$$

For example for a SONET OC3c link (transmission rate 149.76 Mbps) and a minimum transmission rate requirement of 64 kbps, the list 27 should have 2340 slots.

Shown in FIG. 2 at 44 is the format of a list slot entry. As can be seen, an entry 44 comprises two fields, namely a type field and a field holding the VCN of the virtual channel to which the entry relates. In fact, every slot contains an entry but only those with a type field of a value other than '00' are considered occupied—if the type field is '00', the slot is taken to be 'free' and the VCN field invalid. The values of the type other than '00' are used to specify the priority level of the virtual channel indicated by the VCN field ('01' indicates low priority, '10' medium priority, and '11' high priority).

The list update block 41 serves to insert a virtual channel (identified by its VCN) into the list 27 at the request either of the command processor 31 or of the list entry processor 40. This insertion is effected at an offset from the current list slot dependent on the transmission rate of the channel concerned, this rate being specified by the peak rate parameter PRP for GB0 virtual channels and either the peak rate parameter PRP or the sustain rate parameter SRP for GB1 virtual channels (in the latter case the appropriate rate is identified by the requesting entity).

The update block 41 comprises three functional elements, namely an initial target determination element 45, an insert-if-free element 46, and a conflict resolution element 47. The initial target determination element 45 determines into which slot (the target slot) the VCN should be inserted to give the offset from the current slot appropriate for the transmission rate specified by the rate parameter identified in the request to the update block 41. The insert-if-free element 46 then examines this target slot and if it is free (as indicated by the type parameter of its entry 44), a valid entry is made in this slot. This is done by setting the type field to indicate the appropriate priority level for the VCN field and by inserting the VCN into the VCN field. If however, the target slot is already occupied by a valid VCN entry (a 'hit'), the conflict resolution element 47 is activated. This element 47 compares the priority levels associated with the occupying VCN entry and the VCN requiring insertion. If the latter has a higher priority level, it is inserted in the slot and the previously occupying entry now becomes the VCN requiring insertion; otherwise the occupying entry remains undisturbed and the original VCN requiring insertion remains the VCN requiring insertion. The conflict resolution element 47 then passes the VCN requiring insertion back to the insert-if-free element 46 but with a new target slot specified, this new target slot being the previous target slot incremented by one. Processing by the elements 46 and 47 is then effected iteratively until a free entry is found into which the VCN requiring insertion can be placed without triggering operation of the conflict resolution element 47.

The control of the operation of the GB scheduler 25 is effected by the list entry processor 40. This operation will be described in the next section.

Operation of the GB Scheduler

The operation of the GB scheduler 25 will now be described with reference to the VC state transition diagram of FIG. 3 and the flow chart of FIG. 4, the latter showing the sequencing of operations effected by the list entry processor 40.

The effect of the GB-related commands on the GB scheduler will first be considered.

When a GBSETUP command is received by the command processor 31 to set up a new virtual channel, a VC entry is made in the VC parameter memory 24 with the ON/OFF flag set to OFF, the state of the virtual channel set to STOP, and the NO-CELLS parameter set True; if the channel concerned is a GB1 virtual channel, its credit amount is set to the burst limit value BT. No entry is made for the virtual channel at this time in the list 27.

In due course, a GBSTART command will be received for the virtual channel. This command may have been preceded by a GBCELLS command causing the NO-CELLS parameter to be set False. If cells are available, receipt of the GBSTART command by the command processor results in the virtual channel state being changed to RUN and the update block 41 is requested by the command processor 31 to insert the virtual channel into the list 27 at peak rate offset. On the other hand, if no cells are available when the GBSTART command is received, the state of the channel is simply set to WAIT.

If the GBCELLS command is received when the virtual channel is in its WAIT state, the command processor 31 sets the NO-CELLS parameter to FALSE, changes the state of the virtual channel to RUN, and requests the update block 41 to insert the virtual channel into the list 27 at peak rate offset. If the GBCELLS command is received when the virtual channel (in this case, a GB1 channel) is in its ACCUM state, the command processor 31 sets the NO-CELLS parameter to FALSE and changes the state of the virtual channel to RUN (as the virtual channel is already in the list 27, the command processor does not request its insertion).

When the command processor 31 receives the GBSTOP command for a virtual channel, it sets the ON/OFF flag of the corresponding VC entry 44 to OFF. The processor 31 does not however change the state of the virtual channel or remove any corresponding entry from the list 27; this is done in due course by the list entry processor 40.

Finally, the GBRESET command results in the VC entry 44 for the specified virtual channel being reset.

Next the main operational task of the GB scheduler 25 will be considered, this being the entry processing task effected during each cell period for which control is passed to the GB scheduler by the main control block 33. This entry processing task is controlled by the entry processor 40, FIG. 4 being a flow chart depiction of the control effected by the processor 40.

Figure 4:
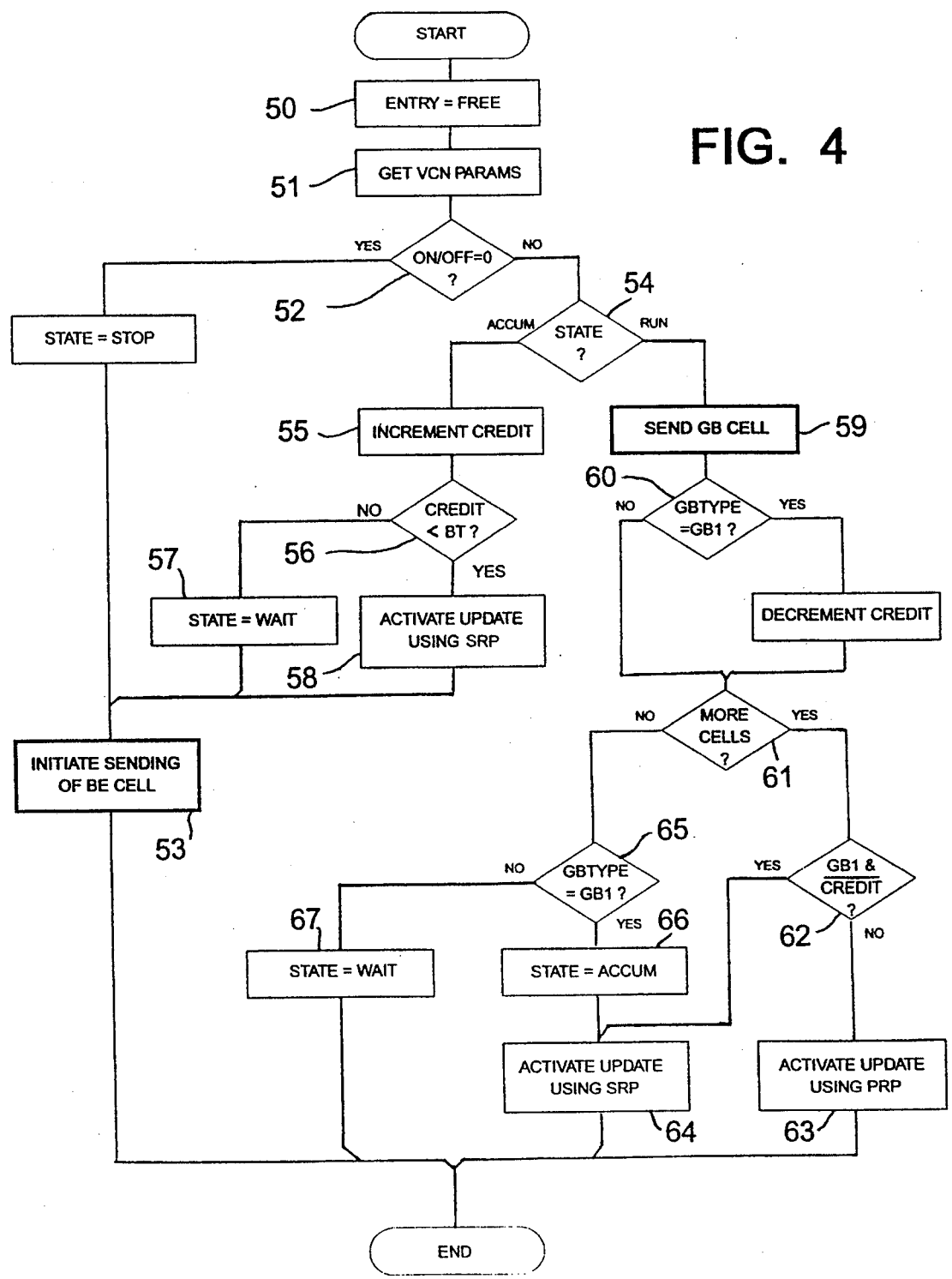
FIG. 4 is a flow chart illustrating the operation of a list entry processor of the guaranteed-bandwidth scheduler of FIG. 2.

The first operation carried out by the entry processor 40 upon being handed control, is to read the VCN in the entry held in the current list slot pointed to by the current slot tracker 28; at the same time, the entry processor frees this entry by setting its type field to '00' (see block 50 in FIG. 4). Next, the processor 40 reads the relevant VC parameters for the virtual channel concerned from the VC parameter memory 24 (block 51).

The first VC parameter considered by the entry processor 40 is the ON/OFF parameter (block 52). If this parameter is set to OFF ('0'), then the processor recognises that the virtual channel concerned has been subject of a STOP command and the list entry just read is no longer valid. Accordingly, the processor 40 sets the state parameter for the channel to STOP in memory 24 and initiates the sending of a best effort cell by the best-effort organiser 30 for the current cell period (block 53). Of course, the VCN just read from the list 27 is not re-inserted in the list.

If the ON/OFF parameter indicates that the virtual channel is active, the entry processor then looks at the current state of the channel (block 54). In fact, valid entries in the list 27 can only relate to virtual channels in the RUN state or, additionally for GB1 channels, in the ACCUM state.

If the state parameter is set to ACCUM thereby indicating a GB1 virtual channel that has no cells to send but is accumulating credit, the entry-processor 40 will next increment the credit value held in the credit field of the VC entry 42 for the channel concerned (block 55). If the total credit now equals the burst tolerance value BT (tested in block 56), the virtual channel state is changed to WAIT (block 57) and the VCN of the channel is not inserted back into the list 27. However, if the credit value is less than BT, the virtual channel is left in its ACCUM state and is reinserted in the list 27 at an offset determined by the SRP parameter; this reinsertion is effected by the update block 41 in the manner already described, at the request of the entry processor (block 58). The final step of dealing with a virtual channel in its ACCUM state, is to initiate the sending of a best effort cell by the best effort organiser 30 for the current cell period (block 53).

For a virtual channel found to be in its RUN state (block 54 test), the entry processor 40 initiates the sending of a cell (block 54) by outputting the VCN of the channel on line 19 to the send interface 13. Next, if the virtual channel is a GB1 channel (tested in block 60) its credit count held in the corresponding entry in memory 24 is decremented, unless already zero. Thereafter, the entry processor 40 determines whether the VCN of the channel should be re-inserted in the list 27. This involves determining if there are more cells remaining to be sent on the virtual channel (block 61); this information is available by checking to see if a 'No More Cells' signal has been supplied on line 20. In the case of there being more cells to send, then the VCN of the channel is reinserted into the list 27 at an offset determined by the peak rate parameter, PRP (block 63) except for GB1 channels with no credit (tested for in block 62) which are inserted at an offset determined by the sustain rate parameter SRP (block 64). When there are no more cells available for sending, if the channel concerned is a GB1 channel (tested for in block 65), its state is set to ACCUM (block 66) and its VCN is reinserted in list 27 at an offset determined by the sustain rate parameter SRP (block 64) to enable the channel to accumulate credit. If the test in block 65 shows the channel to be a GB0 channel, its state is set to WAIT (block 67) and its VCN is not reinserted in the list 27.

Figure 3:
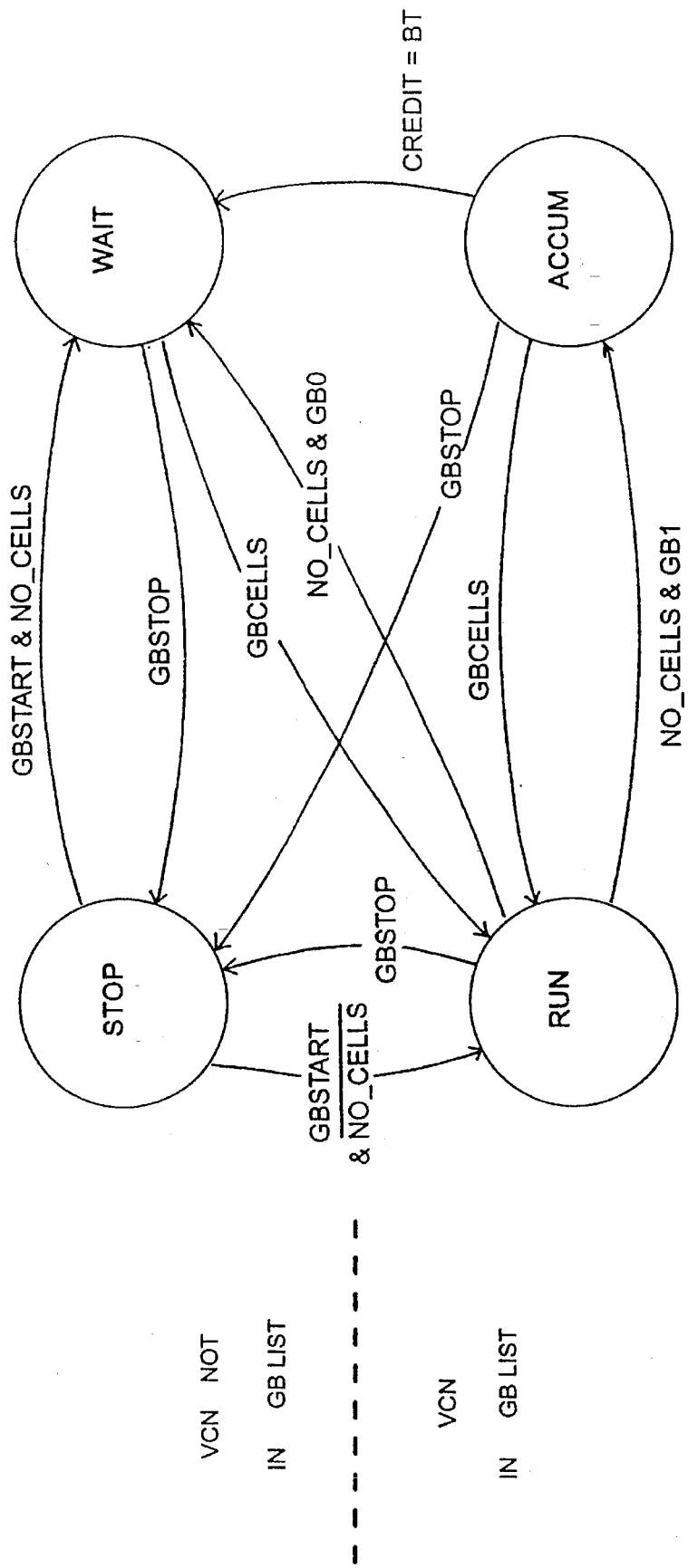
FIG. 3 is a state transition diagram showing the states of a virtual channel as managed by the FIG. 1 scheduler.

The above described virtual-channel state transitions caused by the GB commands and by the actions of the entry processor 40 are illustrated in FIG. 3.

Variants

It will be appreciated that the foregoing description is based on the functional components required of the scheduler and that these components may be implemented in any suitable manner. Infact, it will generally be desirable to implement the scheduler in hardware in order to maximise throughput.

It will also be appreciated that many variations are possible to the described arrangement and the functional sub-elements may be associated differently. For example, although in the described arrangement it is the entry processor 40 that frees each list slot, this freeing could be considered as being effected by a separate functional element. Again, the test carried in block 36 by the main control 33 of the scheduler could equally be effected by the entry processor 40, the main control in this case merely determining whether the command processor 31 is to be activated or whether control should be passed straight to the guaranteed bandwidth scheduler 25.

Another possible variant concerns the mechanism for determining when there are no cells remaining to be sent on a virtual channel. Rather than relying on feedback over the lines 16 and 20, the VC entry 42 in the parameter memory 24 could be used to keep a count of the cells remaining to be sent, each GBCELLS command specifying the number of new cells available and incrementing the cell count accordingly whilst the entry processor 40 decrements the cell count each time it initiates the sending of a cell on the virtual channel concerned.

With regard to credit accumulation, although this is preferably done by retaining the relevant virtual channels in the list, it is possible to provide a separate mechanism for accumulating credit for GB1 channels that have no cells to send.

Yet another possible variant concerns how the priority level of a channel is indicated. Although the priority of each channel is described as being indicated by a discrete priority level parameter, it is conceivable that the priority of a channel could be linked to another parameter and not separately specified (for example, the priority of a channel could be made proportional to its transmission rate, in which case the transmission rate indicator of the channel could double as a priority indicator for the channel).

I claim:

1. A guaranteed-bandwidth scheduler for scheduling the transmission of cells of guaranteed-bandwidth virtual channels, the channels being identified in the scheduler by respective identifying labels, herein VCNs; the scheduler comprising:

a circular list having a predetermined number of entry slots each capable of storing a single VCN;

initial-insertion means for inserting into a respective slot in said list a VCN of each guaranteed-bandwidth virtual channel with a cell available for transmission, each said guaranteed-bandwidth virtual channel being represented once in the list;

control means for advancing through the list slot by slot and for processing the VCN, if any, found in a current slot of interest whereby to cause transmission of a cell of a corresponding virtual channel, the control means being further operative to remove the VCN, if any, in the current slot of interest, and if there are still cells to send on a virtual channel concerned, to insert the VCN in a target slot offset ahead of the current slot by an amount dependent on a predetermined transmission rate for the virtual channel concerned, the control means including conflict resolution means for resolving conflicts should the target slot for inserting the VCN be already occupied.

2. A guaranteed-bandwidth scheduler according to claim 1, wherein the scheduler is further arranged to build up credit for said each guaranteed-bandwidth virtual channel during periods when it has no cells for sending, such credit being used by the control means for causing cells to be transmitted, when available, at a higher rate than said predetermined transmission rate, this credit build up being effected by the initial-insertion means including the VCN of the virtual channel concerned in said list, and by the control means upon encountering the VCN as it advances through the list, increasing the credit of the channel, the VCN being reinserted into the list by the control means unless its credit has reached a predetermined maximum value.

3. Apparatus for transmitting a stream of cells onto a link, the cells being associated with a plurality of different virtual channels each of which is identified in the apparatus by a respective virtual-channel identifier, herein "VCN"; the apparatus including a guaranteed-bandwidth scheduler for scheduling the transmission of cells of guaranteed-bandwidth virtual channels, the scheduler comprising:

a circular list having a predetermined number of entry slots each capable of storing a single VCN, each guaranteed-bandwidth virtual channel with a cell available for transmission, being represented in the list by the presence of its identifying VCN in a respective slot;

parameter storage means for storing virtual-channel parameter data specifying for each virtual channel a priority level and a transmission rate indicator;

current-slot means for identifying an entry slot as the current entry slot of interest and for periodically advancing the current entry slot one slot around the circular list;

processing means for accessing the current entry slot and for processing the VCN, if any, entered therein to cause the transmission of a cell of the corresponding virtual channel, the processing means including means for freeing the current entry slot; and update means for inserting a specified VCN in the list ahead of the current entry slot, each VCN processed by the processing means for which a cell is still available for transmission being passed by the processing means to the update means as said specified VCN, and the update means comprising:

initial-target means for determining the initial position of a target entry slot for insertion of said specified VCN, the initial position of the target slot being at an offset from the current entry slot dependent on the transmission rate indicator for the virtual channel concerned, insertion means for inserting the specified VCN in the target slot unless there is already an occupying VCN in the slot; and conflict-resolution means activated by the insertion means in the presence of an occupying VCN in the target slot for determining on the basis of the associated virtual-channel priorities which of the specified and occupying VCN should take the target slot, said specified VCN taking the slot if it is of higher priority and the occupying VCN becoming said specified VCN for handling by the insertion means with a target slot corresponding to an entry slot subsequent to the one just considered.

4. Apparatus according to claim 3, further including best-effort scheduling means for controlling the transmission of cells of best-effort virtual channels, the apparatus being responsive to said current entry slot of the guaranteed-bandwidth scheduler being free to initiate transmission of a cell under the control of said best-effort scheduling means.

5. Apparatus according to claim 3, wherein the priority level of each virtual channel whose VCN is represented in said list, is stored in the list with the VCN; said conflict-resolution means determining the priority level of said occupying VCN by reading it from the slot concerned.

6. Apparatus according to claim 3, wherein each slot of said circular list has an associated indicator whether the slot is free or contains an occupying VCN, said means for freeing the current entry slot setting the associated indicator to indicate the slot as free and any VCN in the slot being thereupon treated as invalid; said update means when inserting a VCN into a slot changing the associated indicator to indicate the slot as being occupied.

7. Apparatus according to claim 6, wherein said associated indicator when set to indicate the associated slot as being occupied is set to a particular value in a range of values, said particular value being indicative of the priority level of the VCN stored in the slot; said conflict-resolution means determining the priority level of said occupying VCN by reference to the associated indicator.

8. Apparatus according to claim 3, wherein said processing means is responsive to guaranteed-bandwidth virtual channels of a predetermined type, only to notify the VCN of such a channel to the update means as said specified VCN if there is at least one cell available for sending in respect of that channel.

9. Apparatus according to claim 3, wherein said parameter storage means stores for each virtual channel of a given type, a credit level and two values for the corresponding transmission rate indicator, these values being a peak rate value and a sustain rate value; the guaranteed-bandwidth scheduler further comprising:

credit-increase means for progressively increasing the credit level of a virtual channel of said given type during periods when that channel has no cells available for sending; and credit-decrease means for decreasing the credit level, if any, of a virtual channel of said given type each time a cell is transmitted on that channel; said initial-target means being responsive to the update means being passed said specified VCN relating to a virtual channel of said given type, to determine the initial position of said target slot in dependence:

on the peak rate value of said transmission rate indicator if the virtual channel concerned has credit available as indicated by said credit level, otherwise, on the sustain rate value of said transmission rate indicator.

10. Apparatus according to claim 9, wherein said credit-increase means is constituted by the processing means, said processing means being responsive to the presence, in said current slot, of the VCN of a virtual channel of said given type,:

(a)—to cause the transmission of a cell on that channel if there is a cell available for transmission and otherwise to increase the credit level of the channel; and (b)—to notify the VCN of the channel to the update means as said specified VCN regardless of whether there are any cells available for sending in respect of that channel;

the initial-target means determining the initial position of said target slot for a virtual channel of said given type with no cells for transmission, on the basis of the channel's sustain rate value.

11. Apparatus according to claim 10, wherein in step (b), where a channel has no cells available for transmission, the processing means only notifies the VCN of the channel to the update means as a specified VCN, if the credit level of the channel is below a threshold level stored in said parameter storage means for that channel.

12. A method of scheduling the transmission of cells of guaranteed-bandwidth virtual channels each of which is identified by a respective virtual-channel identifier, herein "VCN": the method comprising the steps of:

providing a circular list having a predetermined number of entry slots and storing in a respective slot the VCN of each virtual channel with a cell available for transmission, advancing around the list from slot to slot and processing each VCN encountered to cause the transmission of a cell of the corresponding virtual channel; and updating the list by freeing each slot advanced past and inserting back into the list any VCN that occupied the slot if that VCN relates to a virtual channel with another cell to transmit, this insertion being effected by the sub-steps of:

(a) determining the initial position of a target entry slot for insertion of said VCN, the initial position of the target slot being at an offset from the slot previously occupied by the VCN, dependent on a transmission rate indicator of the virtual channel concerned, (b) inserting the VCN in the target slot unless there is already an occupying VCN in the slot; and (c) where there is an occupying VCN in the target slot, determining on the basis of priority levels associated with the virtual channels, which of the VCN requiring insertion and the occupying VCN should take the target slot, the VCN requiring insertion taking the slot if it is of higher priority and the occupying VCN being passed back to sub-step (b) with a target slot corresponding to an entry slot subsequent to the one just considered.

\* \* \* \* \*